US012186609B2

(12) United States Patent
Keeling et al.

(10) Patent No.: US 12,186,609 B2
(45) Date of Patent: Jan. 7, 2025

(54) THERMAL TRIGGER SEAT FOR SPRINKLER SYSTEM

(71) Applicant: Tyco Fire Products LP, Lansdale, PA (US)

(72) Inventors: Josh Keeling, Harrisville, RI (US); Lyle Miller, Milford, CT (US); Robert Hackett, Cranston, RI (US); Barbara Churchill, Pawtucket, RI (US)

(73) Assignee: Tyco Fire Products LP, Cranston, RI (US)

( * ) Notice: Subject to any disclaimer, the term of this patent is extended or adjusted under 35 U.S.C. 154(b) by 155 days.

(21) Appl. No.: 18/146,910

(22) Filed: Dec. 27, 2022

(65) Prior Publication Data

US 2023/0136899 A1 May 4, 2023

Related U.S. Application Data

(63) Continuation of application No. 17/719,034, filed on Apr. 12, 2022.

(60) Provisional application No. 63/174,736, filed on Apr. 14, 2021.

(51) Int. Cl.
*A62C 37/11* (2006.01)
*A62C 35/62* (2006.01)
*A62C 35/68* (2006.01)

(52) U.S. Cl.
CPC .............. *A62C 37/11* (2013.01); *A62C 35/62* (2013.01); *A62C 35/68* (2013.01)

(58) Field of Classification Search
CPC .......... A62C 37/11; A62C 35/62; A62C 35/68
USPC ...................................................... 169/37, 41
See application file for complete search history.

(56) References Cited

U.S. PATENT DOCUMENTS 6,112,821 A 9/2000 Yokoi
2006/0113093 A1* 6/2006 Silva, Jr. ................ A62C 37/14 169/37

* cited by examiner

*Primary Examiner* — Christopher S Kim
(74) *Attorney, Agent, or Firm* — Foley & Lardner LLP

(57) ABSTRACT

Systems and methods described herein are directed to a sprinkler to provide fire protection. The sprinkler system can include a deflector portion, a head portion, a thermal trigger portion, a trigger seat, or a tubular outer structure. The tubular outer structure can define an internal water flow channel. The water flow channel can extend along a longitudinal axis between an inlet and an outlet. The trigger seat can include a tubular exterior. The tubular exterior can be coupled with the tubular outer structure. The trigger seat can include a component. The component can occlude a flow of fluid through the dry pendent sprinkler assembly. The component can maintain the thermal trigger portion in position. At least one portion of the tubular exterior of the trigger seat can protrude into the water flow channel at an angle towards the longitudinal axis.

20 Claims, 12 Drawing Sheets

THERMAL TRIGGER SEAT FOR SPRINKLER SYSTEM

CROSS-REFERENCE TO RELATED APPLICATIONS

The present application is a continuation of U.S. patent application Ser. No. 17/719,034, filed Apr. 12, 2022, which claims the benefit of and priority to U.S. Provisional Application No. 63/174,736, filed Apr. 14, 2021, the disclosure of which is incorporated herein by reference in its entirety.

BACKGROUND

Buildings and other areas can include sprinklers to provide fire protection. In the event of a fire, the sprinklers can dispense a fluid to suppress or extinguish the fire or to protect building elements from exposure to heat radiating from the fire.

SUMMARY

At least one aspect is directed to a sprinkler system to provide fire protection. The sprinkler system can include a dry pendent sprinkler assembly. The dry pendent sprinkler assembly can include a deflector portion, a head portion, a thermal trigger portion, a trigger seat, or a tubular outer structure. The tubular outer structure can define an internal water flow channel. The water flow channel can extend along a longitudinal axis between an inlet and an outlet. The trigger seat can include a tubular exterior. The tubular exterior can be coupled with the outer structure. The trigger seat can include a component. The component can occlude a flow of fluid through the dry pendent sprinkler assembly. The component can maintain the thermal trigger portion in position. At least one portion of the tubular exterior of the trigger seat can protrude into the water flow channel. The portion of the tubular exterior of the trigger seat can protrude into the water flow channel at an angle towards the longitudinal axis.

At least one aspect is directed to a method of providing fire protection. The method can include providing a dry pendent sprinkler assembly. The dry pendent sprinkler assembly can include a deflector portion, a head portion, a thermal trigger portion, a trigger seat, or a tubular outer structure. The tubular outer structure can define an internal water flow channel. The water flow channel can extend along a longitudinal axis between an inlet and an outlet. The trigger seat can include a tubular exterior. The tubular exterior can be coupled with the outer structure. The trigger seat can include a component. The component can occlude a flow of fluid through the dry pendent sprinkler assembly. The component can maintain the thermal trigger portion in position. The method can include disposing at least one portion of the tubular exterior of the trigger seat to protrude into the water flow channel. The portion of the tubular exterior of the trigger seat can protrude into the water flow channel at an angle towards the longitudinal axis.

At least one aspect is directed to a method of providing fire protection. The method can include providing a dry sprinkler system to provide fire protection. The dry sprinkler system can include a deflector portion, a head portion, a thermal trigger portion, a trigger seat, or a tubular outer structure. The tubular outer structure can define an internal water flow channel. The water flow channel can extend along a longitudinal axis between an inlet and an outlet. The trigger seat can include a tubular exterior. The tubular exterior can be coupled with the outer structure. The trigger seat can include a component. The component can occlude a flow of fluid through the dry pendent sprinkler assembly. The component can maintain the thermal trigger portion in position. At least one portion of the tubular exterior of the trigger seat can protrude into the water flow channel. The portion of the tubular exterior of the trigger seat can protrude into the water flow channel at an angle towards the longitudinal axis.

DETAILED DESCRIPTION

Before turning to the figures, which illustrate certain examples, it is noted that the present disclosure is not limited to the details or methodology set forth in the description or illustrated in the figures. The terminology used herein is for the purpose of description only and should not be regarded as limiting.

The present disclosure generally refers to a fire protection sprinkler. The present disclosure refers to a dry pendent fire protection sprinkler assembly configured to disperse water from a sprinkler over a desired area.

At least one aspect of the present disclosure is a sprinkler system to provide fire protection. The sprinkler system includes a dry pendent sprinkler assembly. The dry pendent sprinkler assembly generally includes a tubular outer structure, a deflector portion, a head portion, a thermal trigger portion, and a trigger seat. The outer structure defines an internal water flow channel extending along a longitudinal axis between an inlet and an outlet. The trigger seat includes a tubular exterior positioned parallel with the outer structure. The tubular exterior includes a component to block a flow of fluid through the system and maintain the thermal trigger portion in positon when the system is not activated. The system generally includes at least one portion of the tubular exterior protruding into the water flow channel at an angle towards the longitudinal axis.

During activation, the thermal trigger portion can be ejected from the system as a response to fire conditions so that fluid can flow through the dry pendent sprinkler assembly. The fluid can flow through the internal water flow channel from the inlet towards the outlet. This fluid can make contact or engage with the portion of the tubular exterior of the trigger seat protruding into the water flow channel at an angle. This engagement can cause the trigger seat to be ejected from the system in a lateral direction.

Referring generally to the figures, fire protection systems include sprinklers which are configured to inhibit or permit flow of fluid (typically water, but also in some applications fire suppressant fluid) depending upon conditions. In the instance of a fire or detected conditions that may be indicative of a fire (e.g., increased heat, smoke, or other indications), the sprinklers are configured to permit the flow of fluid such that the fluid may contact a deflector and be dispersed so as to provide protection to an area.

Figure 1:
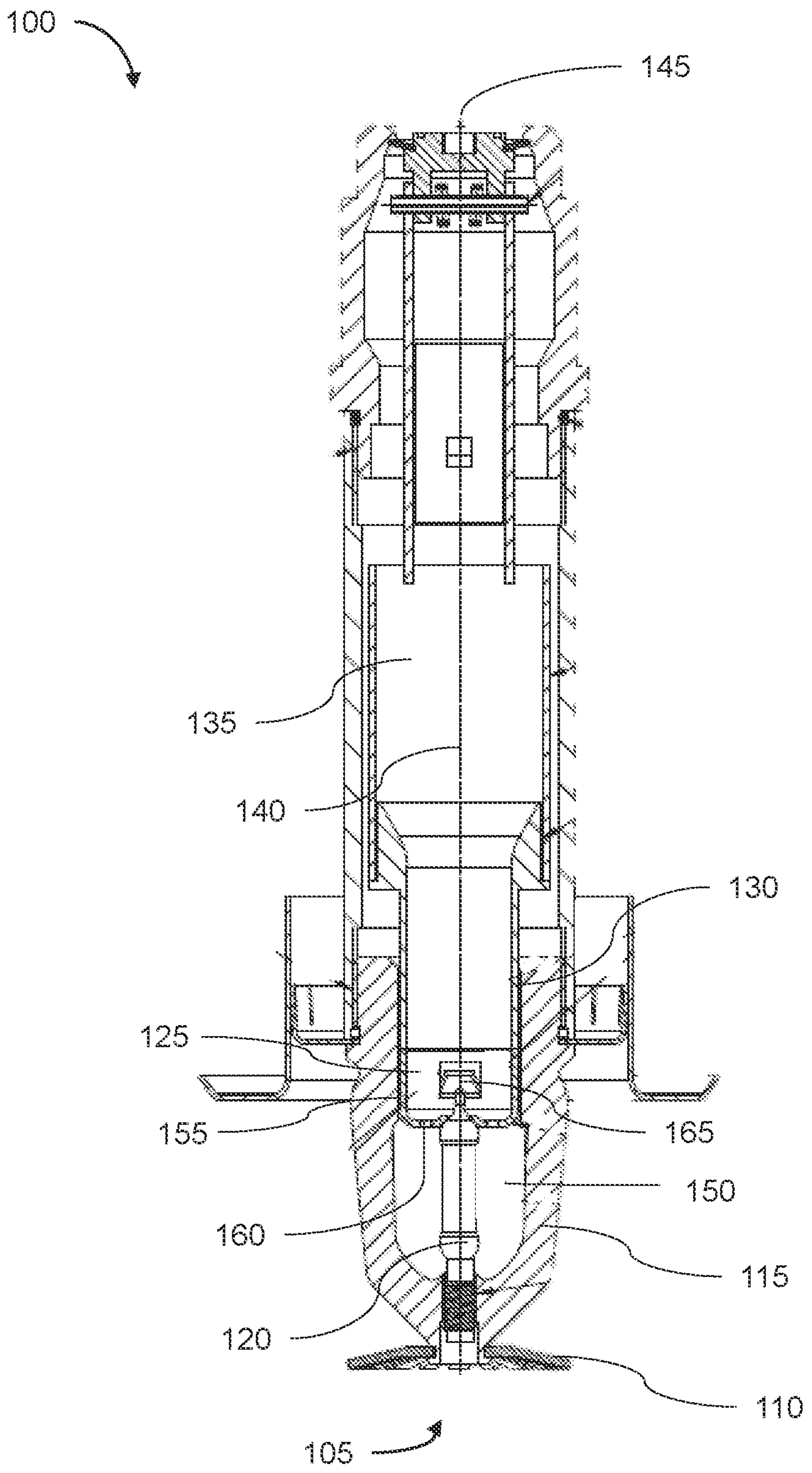
FIG. 1 is an example cross-sectional view of a portion of a sprinkler system, according to an example implementation.
Figure 2:
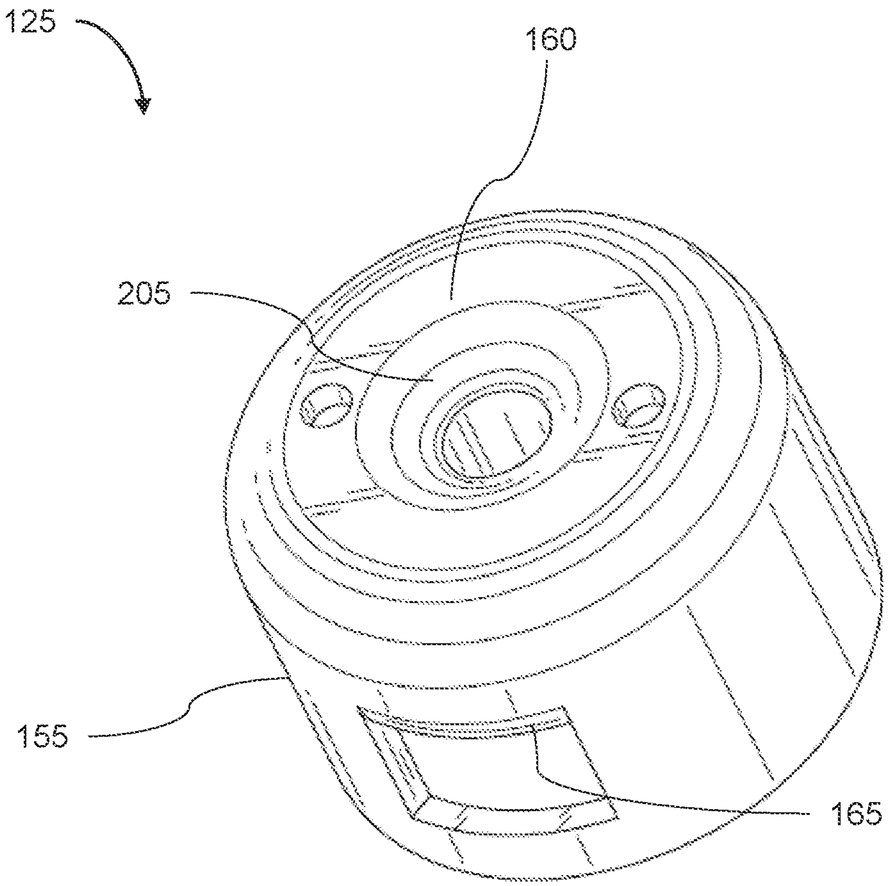
FIG. 2 is an example perspective view of a trigger seat of the sprinkler system of FIG. 1, according to an example implementation.
Figure 3:
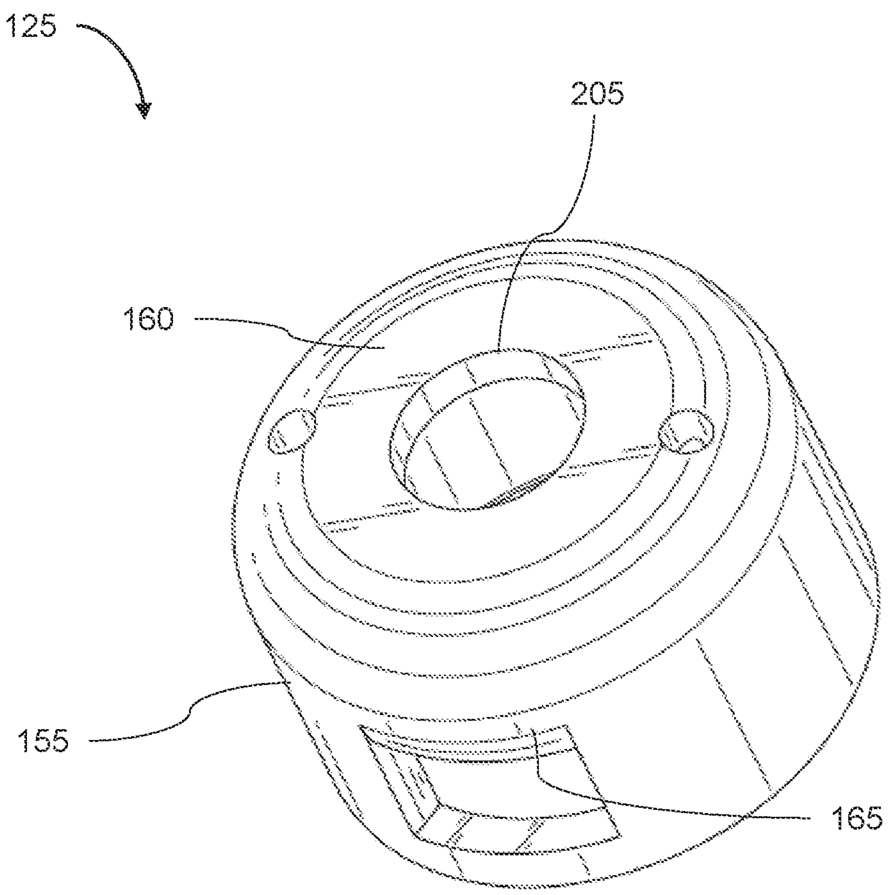
FIG. 3 is an example perspective view of a trigger seat of the sprinkler system of FIG. 1, according to an example implementation.

FIG. 1 depicts a sprinkler system 100. For example, the sprinkler system 100 can provide fire protection. The sprinkler system 100 can include or can be coupled with a fluid supply to provide fire exposure protection fluid. The sprinkler system 100 can include at least one dry pendent sprinkler assembly 105. The dry pendent sprinkler assembly 105 can include at least one deflector portion 110. The deflector portion 110 can be various shapes (e.g., rectangular, triangular, round). The deflector portion 110 can be made of various materials (e.g., metallic, non-metallic). For example, the deflector portion 110 can be shaped to control the spray pattern of the fire exposure protection fluid.

The dry pendent sprinkler assembly 105 can include at least one head portion 115. The head portion 115 can be various shapes (e.g., rectangular, triangular, round). The dry pendent sprinkler assembly 105 can include at least one thermal trigger portion 120. The thermal trigger portion 120 (e.g., thermal element) can respond to a fire condition. For example, the thermal trigger portion 120 can include a glass tube that includes fluid that expands responsive to a temperature increase (e.g., temperature rise due to a fire), such that the glass tube breaks responsive to the temperature meeting or exceeding a threshold temperature. The thermal trigger portion 120 can include a fusible link that includes at least two pieces coupled using a solder that can melt responsive to the temperature meeting or exceeding a threshold temperature, as another example.

The dry pendent sprinkler assembly 105 can include at least one trigger seat 125. The trigger seat 125 can be various shapes (e.g., tubular, rectangular). The trigger seat 125 can be made of various materials (e.g., metallic, non-metallic). The dry pendent sprinkler assembly 105 can include at least one outer structure 130. The outer structure 130 can be tubular in shape. The outer structure 130 can define an internal water flow channel 135. The internal water flow channel 135 can extend along a longitudinal axis 140 between an inlet 145 and an outlet 150. For example, the internal water flow channel 135 can receive fire exposure protection fluid from the inlet 145 and distribute the fluid to the outlet 150 when the system is activated.

The trigger seat 125 can couple with the outer structure 130. The trigger seat 125 can be coupled with the outer structure 130 in various ways. For example, the trigger seat 125 can be positioned against the outer structure 130. The dry pendent sprinkler assembly 105 can include one or more fasteners to couple the trigger seat 125 with the outer structure 130. For example, the trigger seat 125 can be secured with the outer structure 130 by one or more load screws disposed between the deflector portion and the thermal trigger portion 120 that maintains the thermal trigger portion 120 in position relative to the outer structure 130, which further causes the trigger seat 125 to maintain in position relative to the outer structure 130. The trigger seat 125 can be welded to the outer structure 130. The trigger seat 125 can couple with the outer structure 130 in various ways such that the internal water flow channel 135 extends continuously through the trigger seat, as depicted in FIG. 1.

The trigger seat 125 can include a tubular exterior 155. For example, the trigger seat 125 can include an exterior 155 that extends radially about the longitudinal axis 140. The tubular exterior 155 can extend radially parallel with the outer structure 130 of the dry pendent sprinkler assembly 105. The trigger seat 125 can include at least one component 160 to prevent a flow of fluid through the dry pendent sprinkler assembly 105. For example, the trigger seat 125 can include at least one surface (e.g., a flat or curved surface) extending laterally from the tubular exterior 155 to prevent a flow of fluid through the internal water flow channel 135, as depicted throughout the figures. For example, the trigger seat 125 can include several surfaces that extend from the tubular exterior 155 to prevent a flow of fluid. The trigger seat 125 can include at least one element (e.g., stopper, cap, plug) coupled with the tubular exterior 155 to prevent a flow of fluid, as another example.

The trigger seat 125 can maintain the thermal trigger portion 120 in position or the thermal trigger portion 120 can maintain the trigger seat 125 in position. For example, the one or more components 160 (e.g., surfaces) of the trigger seat 125 can include a feature 205 (e.g., an aperture, groove, raised surface, or an insert) to maintain the thermal trigger portion 120 in position, as depicted in at least FIGS. 1-4B, 8, and 9. The component 160 can include any amount of apertures, grooves, surfaces, or other components to maintain the thermal trigger portion 120 in position. For example, the one or more components 160 can include an aperture or groove to maintain a glass tube in place while the system is not in activation. For example, the one or more components 160 can include at least one feature (e.g., fastener, clasp, clamp, aperture, groove, surface) to maintain a fusible link in position.

The feature 205 can extend from the surface of the trigger seat 125 in various directions. For example, as depicted in at least FIGS. 2, 4A, 4B, 7, 8, and 9, the feature 205 can protrude from a portion of the surface (e.g., from component 160). The feature 205 can protrude in an upward direction, in a downward direction, in a sideways direction, or at an angle. The feature 205 can include one or more angled portions, as depicted in at least FIG. 9. For example, the feature 205 can include a cup portion 905 (e.g., angled, flat, stepped, counterbored) that can receive a portion of the thermal trigger portion 120. The cup portion 905 can be disposed on a first or second side of the trigger seat 125 (e.g., on a side exposed to the exterior or on a side exposed to the internal water flow channel 135). The feature 205 can protrude at various heights dependent on a load of the dry pendent sprinkler assembly 105, for example. The feature 205 can lie flush with the surface of the trigger seat 125. For example, the feature 205 can include a hole or other opening to receive a portion of the thermal trigger portion 120, as depicted in at least FIG. 3. The feature 205 can be formed directly with the trigger seat 125 during manufacturing of the trigger seat 125 or the feature 205 can attach with the trigger seat 125 via one or more adhesives, fasteners, welded joints, or other components.

Figure 4A:
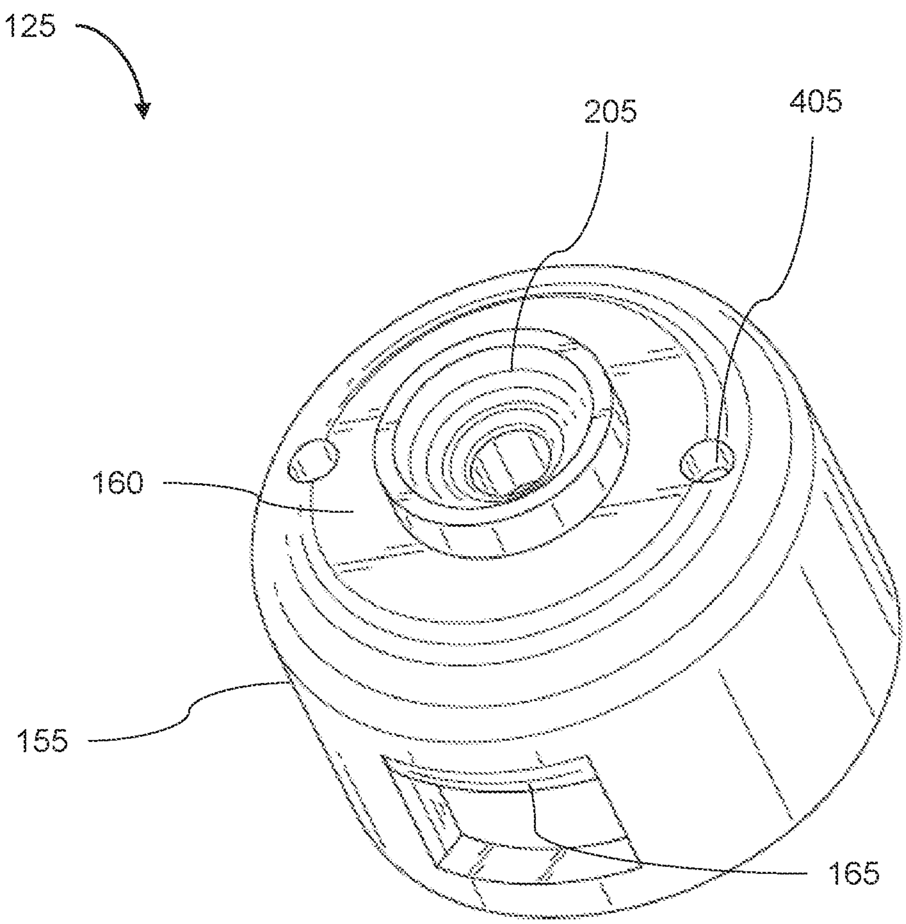
FIG. 4A is an example perspective view of a trigger seat of the sprinkler system of FIG. 1, according to an example implementation.
Figure 4B:
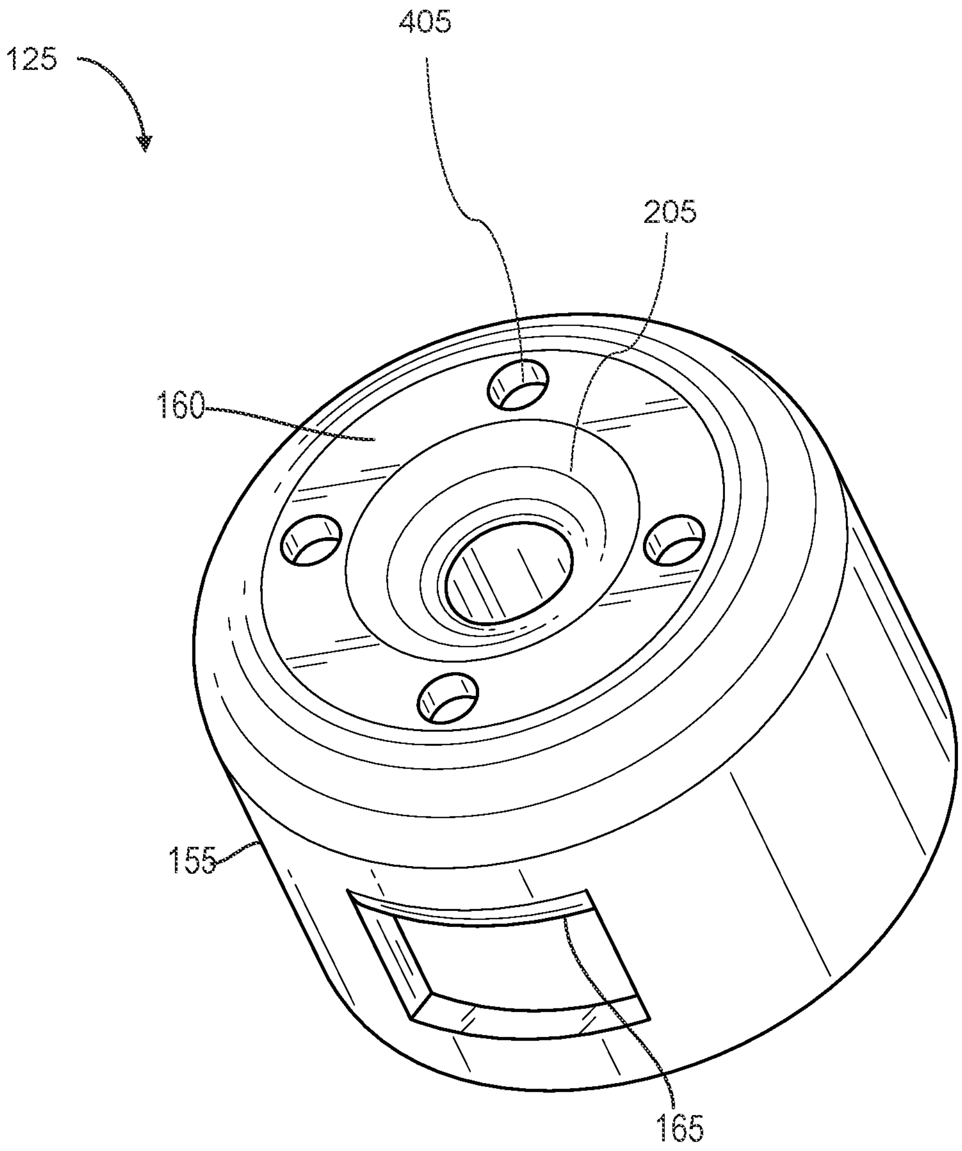
FIG. 4B is an example perspective view of a trigger seat of the sprinkler system of FIG. 1, according to an example implementation.
Figure 5:
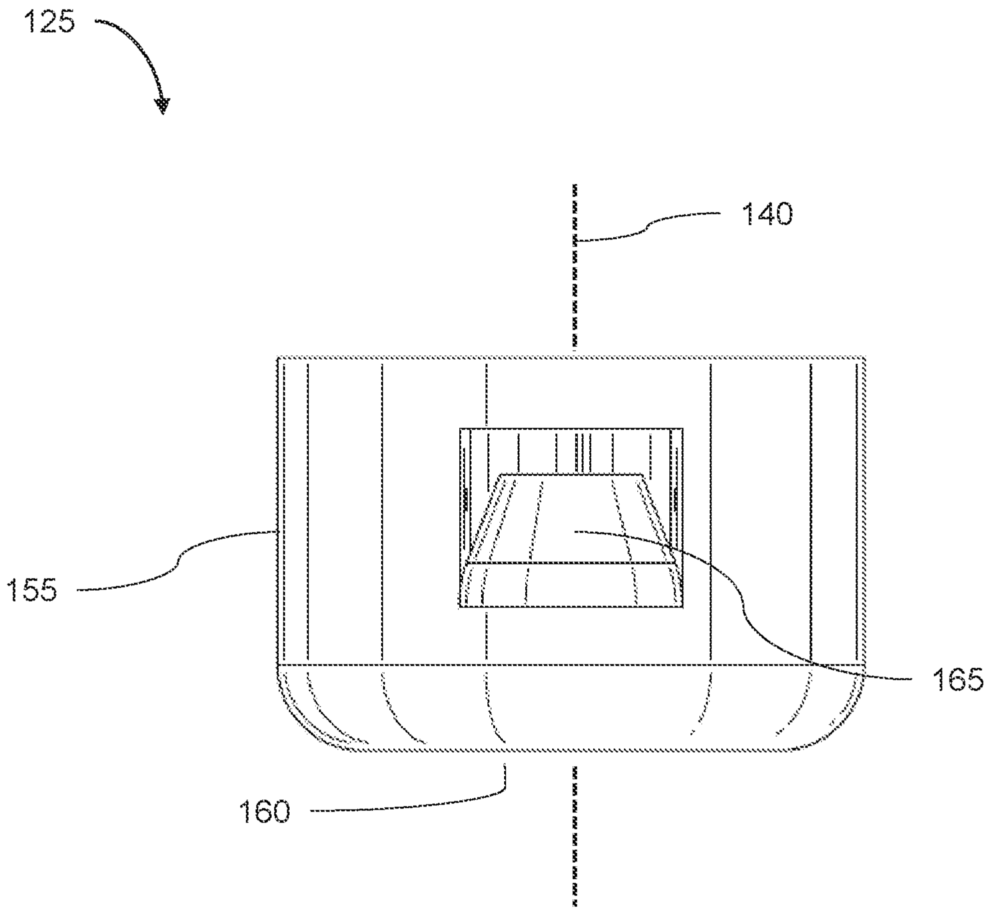
FIG. 5 is an example front view of the trigger seat of FIG. 2, according to an example implementation.
Figure 6:
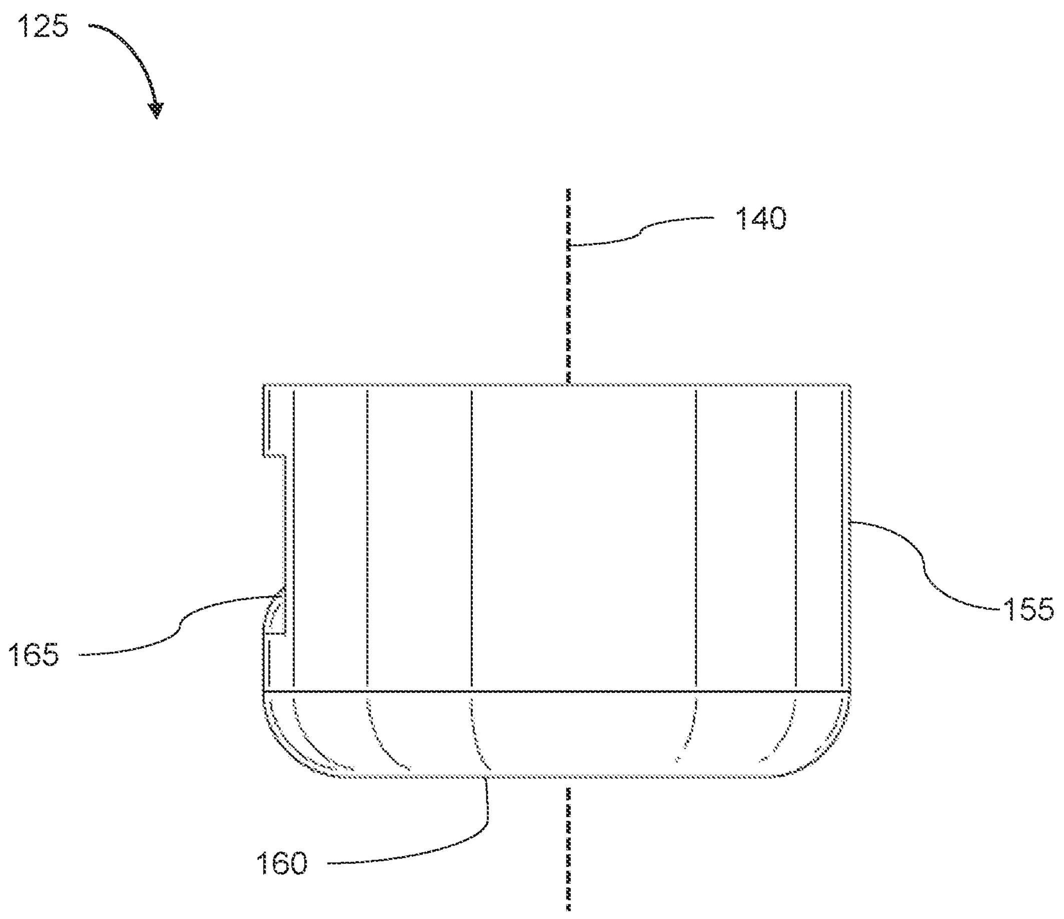
FIG. 6 is an example side view of the trigger seat of FIG. 2, according to an example implementation.

As depicted in at least FIGS. 4A and 4B, the trigger seat 125 can include at least one hole 405, such as a weep hole. The trigger seat 125 can include any amount of holes 405. For example, the trigger seat 125 can include one hole 405. The trigger seat 125 can include two holes 405, as depicted in FIG. 4A, and among others. The trigger seat 125 can include three holes 405, four holes 405, as depicted in FIG. 4B, or more than four holes 405. The trigger seat 125 can include zero holes 405. The trigger seat 125 can include the holes 405 at various positions. For example, at least one hole 405 can position along a flat surface of the trigger seat 125 (e.g., along a flat region of the component 160), as depicted in at least FIG. 2. At least one hole 405 can position along a curved surface of the trigger seat 125 (e.g., along a curved region of the trigger seat 125 between the flat region and a side of the exterior 155), as depicted in at least FIG. 3. The trigger seat 125 can include at least one hole 405 positioned adjacent to the feature 205. The trigger seat 125 can include at least one hole 405 positioned at a distance from the feature 205, as another example. The trigger seat 125 can include holes 405 at any point along the component about the longitudinal axis 140. For example, the holes 405 can align substantially parallel with one or more frame arms of the dry pendent sprinkler assembly 105. The holes 405 can align substantially parallel with a flap or protrusion of the trigger seat 125 (e.g., portion 165 described herein), as another example. The holes 405 can include a variety of shapes and sizes. For example, the holes 405 can be circular, triangular, rectangular, symmetrical, unsymmetrical, oblong, crescent, trapezoidal, any combination, or another shape. The holes 405 can lie flush with the component 160 or the holes 405 can protrude from the component 160.

As depicted in FIGS. 1-8, the trigger seat 125 can include at least one portion protruding into the internal water flow channel 135. For example, the trigger seat 125 can include a portion 165 of the tubular exterior 155 protruding into the internal water flow channel 135. The portion 165 of the tubular exterior 155 can protrude into the internal water flow channel 135 at an angle towards the longitudinal axis 140. For example, a portion 165 of the tubular exterior 155 can extend from the tubular exterior 155 towards the longitudinal axis 140 of the internal water flow channel 135 at an angle of at least 5 degrees. The portion 165 of the tubular exterior 155 can protrude into the internal water flow channel 135 at an angle of 6 degrees. The portion 165 of the tubular exterior 155 can protrude into the internal water flow channel 135 at an angle of 7 degrees. The portion 165 of the tubular exterior 155 can protrude into the internal water flow channel 135 at an angle of 8 degrees. The portion 165 of the tubular exterior 155 can protrude into the internal water flow channel 135 at an angle larger than 8 degrees. The portion 165 can include a variety of shapes including, but not limited to, rectangular, circular, triangular, symmetrical, unsymmetrical, oblong, crescent, trapezoidal, any combination, or another shape.

The portion 165 of the tubular exterior 155 can protrude into the internal water flow channel 135 at an angle greater than or equal to 43 degrees from the trigger seat tubular exterior 155 towards the longitudinal axis 140. For example, the portion 165 of the tubular exterior 155 can protrude into the internal water flow channel 135 at an angle of 43 degrees from the exterior 155. The portion 165 of the tubular exterior 155 can protrude into the internal water flow channel 135 at an angle of 44 degrees from the exterior 155. The portion 165 of the tubular exterior 155 can protrude into the internal water flow channel 135 at an angle greater than 44 degrees from the exterior 155.

The portion 165 of the tubular exterior 155 can protrude into the internal water flow channel 135 at an angle less than or equal to 125 degrees from the trigger seat tubular exterior 155. For example, the portion 165 of the tubular exterior 155 can protrude into the internal water flow channel 135 at an angle of 125 degrees from the exterior 155. The portion 165 of the tubular exterior 155 can protrude into the internal water flow channel 135 at an angle of 124 degrees from the exterior 155. The portion 165 of the tubular exterior 155 can protrude into the internal water flow channel 135 at an angle less than 124 degrees from the exterior 155.

The trigger seat 125 can include at least one component 160 to secure the thermal trigger portion 120 in place until the system 100 is activated. For example, when fire protection fluid is not flowing through the dry pendent sprinkler assembly 105, the component 160 can secure the thermal trigger portion 120 in position, as depicted in FIG. 1. The component 160 can secure the thermal trigger portion 120 in position until the thermal trigger portion 120 is activated or ejected from the system 100.

The portion 165 of the tubular exterior 155 can protrude at an angle into the internal water flow channel 135 such that the portion 165 of the tubular exterior 155 engages with a flow of fluid from the inlet 145 when the thermal trigger portion 120 is activated. For example, the fire protection fluid provided by the inlet 145 can make contact with the portion 165 of the tubular exterior 155 to eject the trigger seat 125 from the system 100.

The portion 165 of the tubular exterior 155 can protrude at an angle into the internal water flow channel 135 such that the portion 165 of the tubular exterior 155 makes contact with a flow of fluid from the inlet 145 to eject the trigger seat 125 in a direction to clear the dry pendent sprinkler assembly 105. For example, the fire protection fluid provided by the inlet 145 can create a downward force against the angled portion 165 of the tubular exterior 155 such that a moment of force directs the trigger seat 125 in a direction to eject from the system 100 and clear the dry pendent sprinkler assembly 105.

The portion 165 of the tubular exterior 155 can protrude at an angle into the internal water flow channel 135 such that the portion 165 of the tubular exterior 155 makes contact with a flow of fluid from the inlet 145 to eject the trigger seat 125 in a direction to clear the deflector portion 110 of the dry pendent sprinkler assembly 105. For example, the fire protection fluid provided by the inlet 145 can create a downward force against the angled portion 165 of the tubular exterior 155 such that a moment of force directs the trigger seat 125 in a lateral direction to eject from the system 100 and clear the deflector portion 110 of the dry pendent sprinkler assembly 105. For example, the trigger seat 125 can clear any fastening components of the deflector portion 110 of the dry pendent sprinkler assembly 105 when ejected from the system 100.

Figure 7:
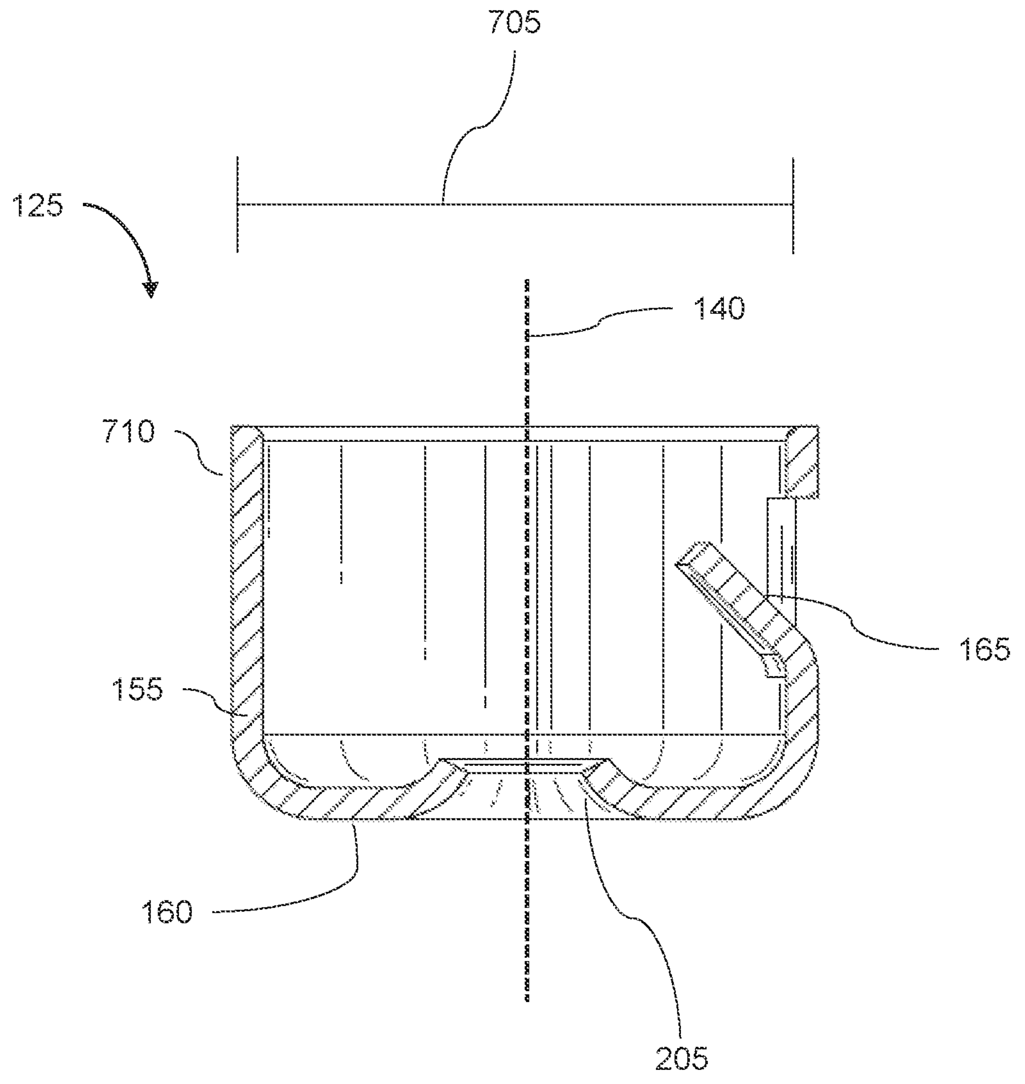
FIG. 7 is an example cross-sectional view of the trigger seat of FIG. 2, according to an example implementation.

A diameter 705 can be defined by a lateral extension of the internal water flow channel 135 from a side of an outer surface 710 of the tubular exterior 155 of the trigger seat 125 to an opposing side of the outer surface 710 of the tubular exterior 155, as depicted in at least FIG. 7. The portion 165 of the tubular exterior 155 protruding into the water flow channel 135 can penetrate the diameter 705 of the internal water flow channel 135. For example, the portion 165 of the tubular exterior 155 can penetrate at least 1% of the diameter 705. For example, if the diameter 705 is 5 inches, the portion

165 of the tubular exterior 155 can protrude into the internal water flow channel 135 to penetrate at least 0.05 inches of the diameter 705. The portion 165 of the tubular exterior 155 can protrude into the water flow channel 135 to penetrate 0.5 inches of the diameter 705, as another example. The portion 165 of the tubular exterior 155 can protrude into the water flow channel 135 to penetrate 2.5 inches, as yet another example.

The portion 165 of the tubular exterior 155 of the trigger seat 125 can protrude into the internal water flow channel 135 to penetrate up to 100% of the internal water flow channel diameter 705. For example, the portion 165 can protrude into the water flow channel 135 to penetrate 75% of the internal water flow channel diameter 705. For example, if the diameter is 3 inches, the portion 165 can protrude into the water flow channel 135 to penetrate 2.25 inches of the diameter 705. The portion 165 can protrude into the water flow channel 135 to penetrate 50% of the internal water flow channel diameter 705. For example, if the diameter is 3 inches, the portion 165 can protrude into the water flow channel 135 to penetrate 1.5 inches of the diameter 705. The portion 165 can protrude into the water flow channel 135 to penetrate less than 50% of the diameter 705 in another example.

Figure 8:
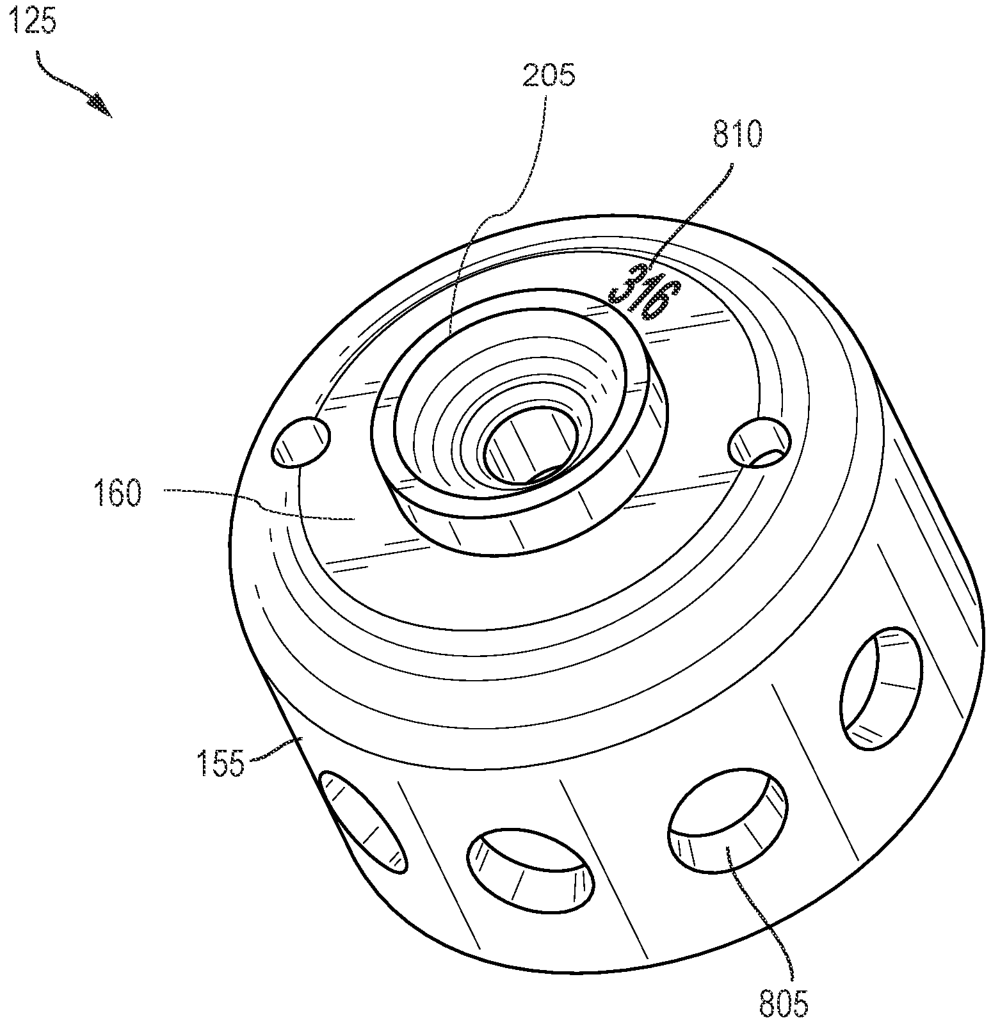
FIG. 8 is an example perspective view of a trigger seat of the sprinkler system of FIG. 1, according to an example implementation.
Figure 9:
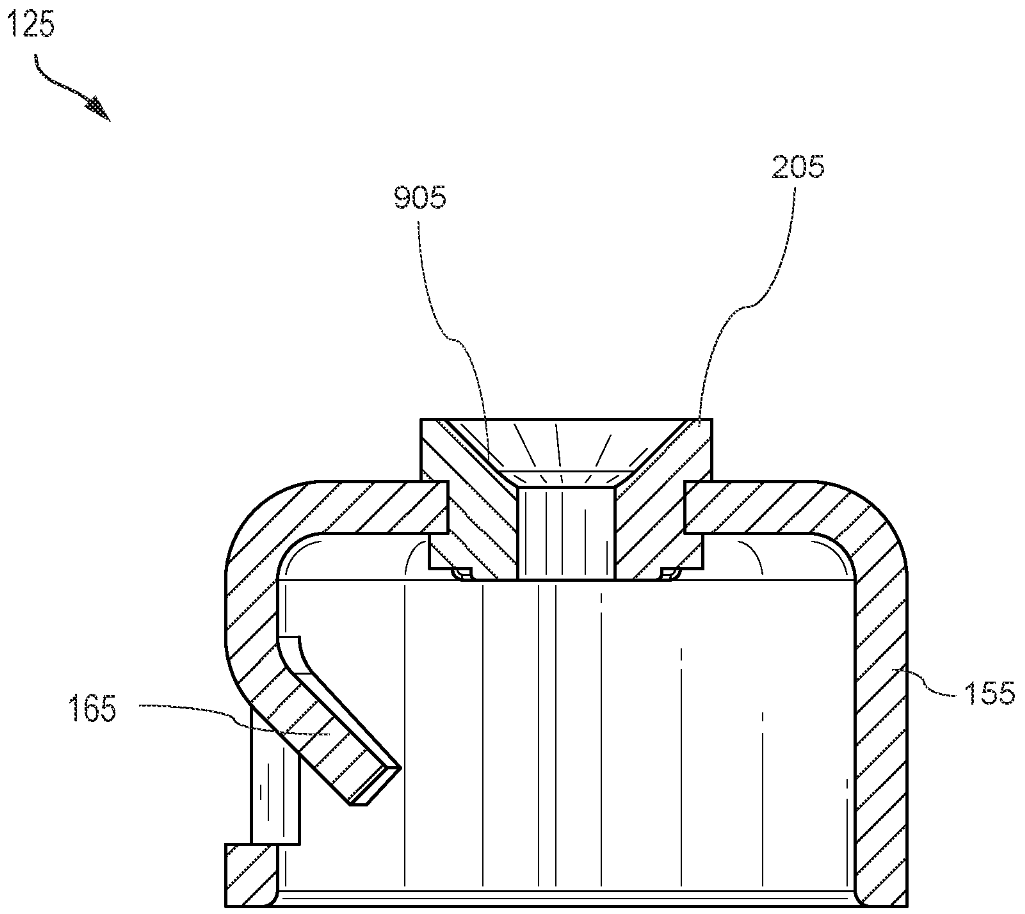
FIG. 9 is an example cross-sectional view of the trigger seat of FIG. 2, according to an example implementation.

As depicted for example in FIG. 8, the trigger seat 125 can include at least one aperture 805 positioned on the tubular exterior 155. For example, the tubular exterior 155 can include a plurality of apertures 805. The apertures 805 can extend circumferentially about the tubular exterior 155 (e.g., about the longitudinal axis 140). The tubular exterior 155 can include apertures 805 that extend circumferentially along the entire exterior 155, as an example. As another example, the tubular exterior 155 can include apertures 805 only along a portion of the exterior 155 (e.g., along half the exterior 155, along 25% of the exterior, or along another portion). The apertures 805 can include a variety of shapes or sizes. For example, each aperture 805 can include the same shape or size. The apertures 805 can differ in shape or size, as another example. The apertures 805 can facilitate reducing an overall weight of the trigger seat 125. For example, at least one aperture 805 can be a through hole of the trigger seat 125 such that the trigger seat 125 includes less material than if the trigger seat 125 did not include any apertures 805. The trigger seat 125 can include any number of apertures 805. For example, the trigger seat 125 can include 0 apertures 805, 1 aperture, 2 apertures, 3 apertures, 4 apertures, 5 apertures, or more.

The trigger seat 125 can include at least one visual indicator. For example, the trigger seat 125 or another component of the dry pendent sprinkler assembly 105 can include one or more different colors (e.g., via colored dyes, black oxide, different materials such as steel or copper) to indicate different components of the dry pendent sprinkler assembly 105. The trigger seat 125 can include at least one marking 810, as another example. For example, the marking 810 can be disposed on the component 160 and between one or more of the holes 405. The marking 810 can include a stamping indicating a property of the dry pendent sprinkler assembly 105.

Figure 10:
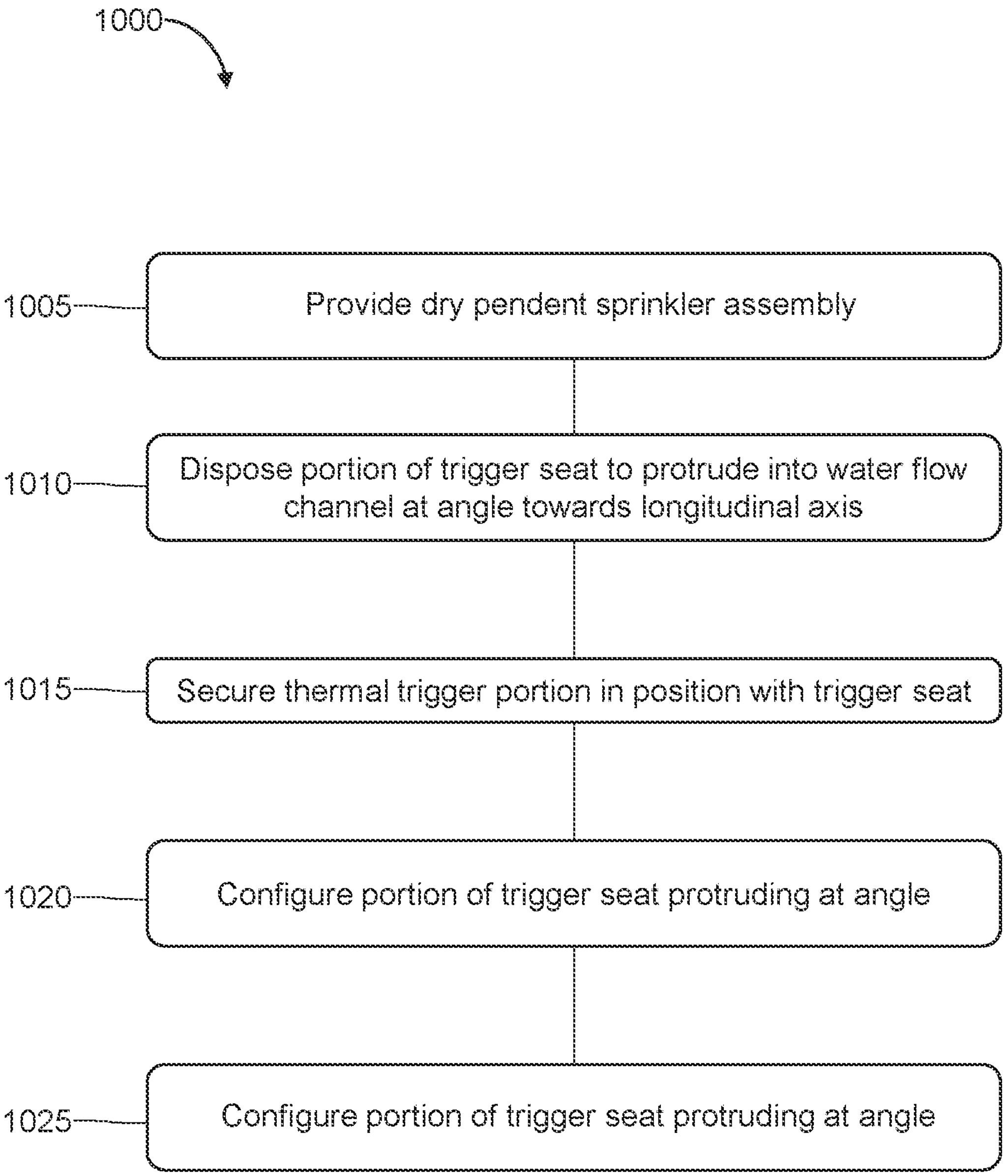
FIG. 10 is an example illustration of a process of providing a sprinkler system, according to an example implementation.

FIG. 10 depicts a method 1000 of providing a sprinkler system to provide fire protection. The method 1000 can include providing a dry pendent sprinkler assembly, as depicted in act 1005. The dry pendent sprinkler assembly can include at least one deflector portion. The deflector portion can be various shapes (e.g., tubular, rectangular). The deflector portion can be made of various materials (e.g., metallic, non-metallic). The dry pendent sprinkler assembly can include at least one head portion. The head portion can be various shapes (e.g., tubular, rectangular). The head portion can be made of various materials (e.g., metallic, non-metallic). The dry pendent sprinkler assembly can include at least one thermal trigger portion. The thermal trigger portion (e.g., thermal element) can respond to a fire condition. The dry pendent sprinkler assembly can include at least one trigger seat. The trigger seat can be various shapes (e.g., tubular, rectangular). The trigger seat can be made of various materials (e.g., metallic, non-metallic). The dry pendent sprinkler assembly can include at least one outer structure. The outer structure can be tubular in shape. The outer structure can define an internal water flow channel. The internal water flow channel can extend along a longitudinal axis between an inlet and an outlet.

The method 1000 can include disposing a portion of a tubular exterior of the one or more trigger seats of the dry pendent assembly to protrude into the internal water flow channel at an angle, as depicted in act 1010. For example, the portion of the tubular exterior can extend from the tubular exterior towards the longitudinal axis of the internal water flow channel at an angle of at least 5 degrees. The portion of the tubular exterior can protrude into the internal water flow channel at an angle of 6 degrees. The portion of the tubular exterior can protrude into the internal water flow channel at an angle of 7 degrees. The portion of the tubular exterior can protrude into the internal water flow channel at an angle of 8 degrees. The portion of the tubular exterior can protrude into the internal water flow channel at an angle larger than 8 degrees.

The portion of the tubular exterior can protrude into the water flow channel at an angle greater than or equal to 43 degrees. For example, the portion of the tubular exterior can protrude into the internal water flow channel at an angle of 43 degrees from the exterior. The portion of the tubular exterior can protrude into the internal water flow channel at an angle of 44 degrees from the exterior. The portion of the tubular exterior can protrude into the internal water flow channel at an angle greater than 44 degrees from the exterior.

The portion of the tubular exterior can protrude into the water flow channel at an angle less than or equal to 125 degrees. For example, the portion of the tubular exterior can protrude into the internal water flow channel at an angle of 125 degrees from the exterior. The portion of the tubular exterior can protrude into the internal water flow channel at an angle of 124 degrees from the exterior. The portion of the tubular exterior can protrude the internal water flow channel at an angle less than 124 degrees from the exterior.

The method 1000 can include securing the one or more thermal trigger portions in position with the trigger seat, as depicted in act 1015. For example, at least one component of the trigger seat can include an aperture or groove to maintain the thermal trigger portion in position. For example, the one or more components can include an aperture or groove to maintain a glass tube in place while the system is not in activation. For example, the one or more components can include at least one feature to maintain a fusible link in position.

The method 1000 can include configuring the portion of the tubular exterior of the one or more trigger seats protruding at an angle to engage with a flow of fluid form an inlet, as depicted in act 1020. The engagement with the flow of fluid can cause the trigger seat to eject from the system. For example, the portion of the tubular exterior can protrude at an angle into the internal water flow channel such that the portion makes contact with a flow of fluid from the inlet to eject the trigger seat in a direction to clear the deflector portion of the dry pendent sprinkler assembly. For example, the fire protection fluid provided by the inlet can create a downward force against the angled portion of the tubular exterior such that a moment of force directs the trigger seat in a direction to eject from the system and clear the deflector portion of the dry pendent sprinkler assembly.

The method 1000 can include configuring the portion of the tubular exterior of the one or more trigger seats protruding at an angle to penetrate a diameter of the internal water flow channel, as depicted in act 1025. The diameter can be defined by the lateral extension of the internal water flow channel from a side of an outer surface of the tubular exterior of the trigger seat to an opposing side of the outer surface of the tubular exterior. The portion of the tubular exterior protruding into the water flow channel can penetrate at least 1% of the diameter of the internal water flow channel. For example, if the diameter is 5 inches, the portion of the tubular exterior can protrude into the internal water flow channel to penetrate at least 0.05 inches of the diameter. The portion of the tubular exterior can protrude into the water flow channel to penetrate 0.5 inches of the diameter, as another example. The portion of the tubular exterior can protrude into the water flow channel to penetrate 2.5 inches of the diameter, as yet another example.

Figure 11:
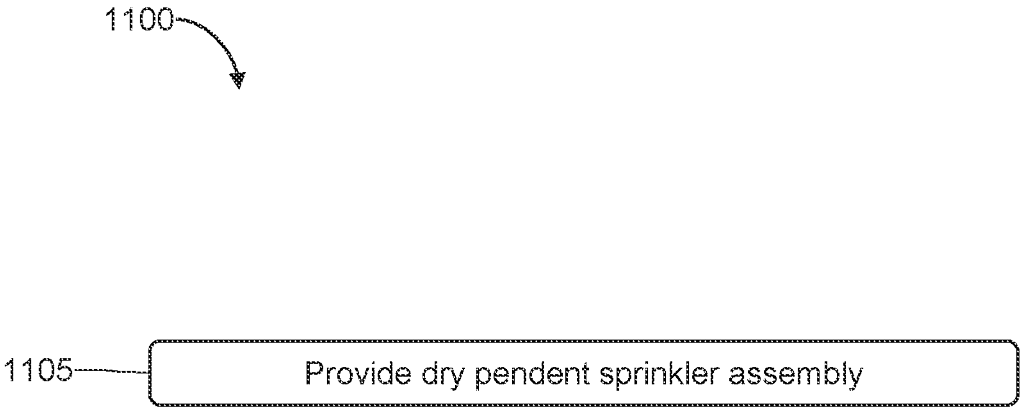
FIG. 11 is an example illustration of a process of providing fire protection, according to an example implementation.

FIG. 11 depicts a method 1100 of providing fire protection. The method 1100 can include providing a dry pendent sprinkler assembly, as depicted in act 1105. The dry pendent sprinkler assembly can include at least one deflector portion. The dry pendent sprinkler assembly can include at least one head portion. The dry pendent sprinkler assembly can include at least one thermal trigger portion (e.g., thermal element) to respond to a fire condition. The dry pendent sprinkler assembly can include at least one trigger seat. The dry pendent sprinkler assembly can include at least one outer structure. The outer structure can define an internal water flow channel. The internal water flow channel can extend along a longitudinal axis between an inlet and an outlet. At least one portion of a tubular exterior of the trigger seat can protrude into the internal water flow channel at an angle towards the longitudinal axis.

The terms "approximately," "about," "substantially", and similar terms are intended to include any given ranges or numbers+/−10%. These terms include insubstantial or inconsequential modifications or alterations of the subject matter described and claimed are considered to be within the scope of the disclosure as recited in the appended claims.

The term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the assembly as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A sprinkler assembly, comprising:
- a structure defining a channel extending between an inlet and an outlet along a longitudinal axis;
- a head portion coupled with the structure;
- a deflector coupled with the head portion;
- a trigger seat coupled with the outlet, the trigger seat comprising:
  - an exterior extending in a longitudinal direction between a first end and a second end, the exterior having at least three apertures disposed circumferentially about the exterior; and
  - a surface extending inward from the second end of the exterior towards a center of the channel; and
- a thermal trigger positioned between the surface and the deflector.

2. The sprinkler assembly of claim 1, comprising:
the surface comprises at least one of a hole, an insert, or a groove to maintain the thermal trigger in position.

3. The sprinkler assembly of claim 1, comprising:
the surface comprises at least one of a hole, an insert, or a groove to maintain the thermal trigger in position, the at least one of the hole, the insert, or the groove protrudes from the surface.

4. The sprinkler assembly of claim 1, comprising:
the longitudinal axis passes through a hole defined in the surface of the trigger seat, the thermal trigger, and the deflector.

5. The sprinkler assembly of claim 1, comprising:
the thermal trigger comprises a glass bulb.

6. The sprinkler assembly of claim 1, comprising:
the trigger seat is coupled with the outlet such that the channel extends into the trigger seat to the surface.

7. The sprinkler assembly of claim 1, comprising:

the surface defines at least one hole disposed inward from the exterior of the trigger seat and outward from where the thermal trigger couples with the surface.

8. The sprinkler assembly of claim 1, comprising:

the exterior of the trigger seat is tubular.

9. The sprinkler assembly of claim 1, comprising:

the sprinkler assembly is a dry pendent sprinkler assembly.

10. The sprinkler assembly of claim 1, comprising:

the at least three apertures include a same size and shape.

11. The sprinkler assembly of claim 1, comprising:

the at least three apertures differ in at least one of size or shape.

12. A dry pendent sprinkler assembly, comprising:

an outer structure forming a channel extending along a longitudinal axis to an outlet;

a head portion extending from the outer structure at least partially outward from the longitudinal axis;

a deflector coupled to the head portion at an opposite end of the head portion from the outer structure;

a trigger seat in the outlet to occlude the channel, the trigger seat comprising an exterior extending in a longitudinal direction between a first end and a second end, the exterior having at least three apertures disposed circumferentially about the exterior and a surface extending inward from the second end of the exterior towards a center of the channel; and a thermal trigger coupled with the surface and positioned between the surface and the deflector.

13. The dry pendent sprinkler assembly of claim 12, comprising:

the surface comprises a component to maintain the thermal trigger in position, the component comprising at least one of a hole, an insert, or a groove.

14. The dry pendent sprinkler assembly of claim 12, comprising:

the surface comprises a component protruding from the surface to maintain the thermal trigger in position, the component comprising at least one of a hole, an insert, or a groove.

15. The dry pendent sprinkler assembly of claim 12, comprising:

the longitudinal axis passes through a hole defined in the surface of the trigger seat, the thermal trigger, and the deflector.

16. The dry pendent sprinkler assembly of claim 12, comprising:

the thermal trigger comprises a glass bulb.

17. The dry pendent sprinkler assembly of claim 12, comprising:

the trigger seat is coupled with the outlet such that the channel extends into the trigger seat to the surface.

18. The dry pendent sprinkler assembly of claim 12, comprising:

the exterior of the trigger seat is tubular.

19. The dry pendent sprinkler assembly of claim 12, comprising:

the at least three apertures include a same size and shape.

20. The dry pendent sprinkler assembly of claim 12, comprising:

the at least three apertures differ in at least one of size or shape.

* * * * *